United States Patent Office 3,356,733
Patented Dec. 5, 1967

3,356,733
PROCESS FOR PRODUCTION OF BIS(TRICHLOROACETYL)-BENZENE ISOMERS AND THEIR MIXTURES
Khachik Egorovich Khchejan, Alla Ezrievna Ioffe, and David Semenovich Azbel, Moscow, U.S.S.R., assignors to Nauchno-Issledovatelsky Institute Sinteticheskikh Spirtov i Organicheskikh Produktov, Moscow, U.S.S.R.
No Drawing. Filed Sept. 22, 1964, Ser. No. 398,387
4 Claims. (Cl. 260—592)

This invention relates to a synthesis of bifunctional compounds which acquire ever growing importance in the industry of polymers, and more particularly it relates to a process for the production of bis(trichloroacetyl)-benzenes used in the synthesis of phthalic acids and chloroform.

Bis(trichloroacetyl)-benzenes can find an extensive use in the production of intermediate products and dyes, insectofungicides, polymers, etc.

Two processes for the production of bis(trichloroacetyl)-benzenes are known.

According to the first process para-bis(trichloroacetyl)-benzene is obtained by the chlorination of 3 g. of para-diacetylbenzene in 30 ml. of chloroform for twelve hours. After being allowed to stand in cold, di- and trichloro compounds are separated from the reaction mixture. On evaporation of one-third of the solvent, tetra- and pentachloro compounds are separated. The filtrate is completely evaporated and the residue is absorbed by glacial acetic acid. The solution is cooled and filtered off, in the solution there being remained para-bis(trichloroacetyl)-benzene only. A half of the solvent is evaporated and, while cooling, crystalline para-bis(trichloroacetyl)-benzene is separated which is then recrystallized from 5 to 7 volumes of glacial acetic acid. The product yield is 50% of theory.

According to the second process meta-bis(trichloroacetyl)-benzene and a mixture of meta- and para-bis(trichloroacetyl)-benzenes are obtained by the chlorination of diacetylbenzene in a molten state at a temperature of from 50 to 200° C., the product yields being close to theoretical (inventors' certificate, the U.S.S.R. 138,613).

However, the known processes have a number of disadvantages. Thus the production of para-bis(trichloroacetyl)-benzene is complicated by the use of a solvent (chloroform) and numerous crystallizations, including the fractional ones. In the reaction a number of by-products are formed, decreasing the yield of the final product. The yield of para-bis(trichloroacetyl)-benzene is low. The process is complicated and can not be carried out in a continuous manner. A further disadvantage lies in the fact that only para-isomer is obtained as a result of the reaction. In case when meta-bis(trichloroacetyl)-benzene and a mixture of meta- and para-bis(trichloroacetyl)benzenes are obtained the process is simple and the product yields are high. However, said process can not be used for the production of pure isomer or meta-bis(trichloroacetyl)-benzene. In the production of phthalic acids and chloroform from the mixtures of bis-(trichloroacetyl)-benzenes it is necessary to separate the mixture of acids into isomers by known methods which are rather complicated.

All this considerably complicates the prior art processes for the production of bis(trichloroacetyl)-benzenes.

Though a number of attempts have been made to overcome the above-mentioned disadvantages, none of them has proved successful with the commercial synthesis of bis(tricholoroacetyl)-benzenes. Thus an attempt was made to obtain para-bis(trichloroacetyl)-benzene by the chlorination of para-diacetylbenzene in a molten state at 50–100° C. (as referred to in the U.S.S.R. Inv. Cert. 138,613).

These attempts have actually proved of no success: the reaction of the chlorination of para-diacetylbenzene lasted 13–16 hours and in most cases it was accompanied by gum formation and condensation of the reaction mixture.

The object of the present inveniton is to work out a simple process for the production of both mixtures and individual isomers of bis(trichloroacetyl)-benzenes of high purity which are intermediate products in the synthesis of isomers of phthalic acids and chloroform.

It has been found that the chlorination of isomers and mixtures of diacetylbenzene for obtaining meta- and para-bis(trichloroacetyl)-benzenes and their mixtures can be easily and readily carried out by the chlorination of diacetylbenzene with small amounts of catalyst being preliminarily added thereto.

In accordance with a preferred embodiment of the invention the chlorination of fatty-aromatic ketones and polyketones should be carried out with the reaction material being in a molten state without solvents but with small additions of hexamethylenetetramine which accelerates the reaction and prevents undesirable side- process (condensation of the reaction mixture).

The advantages of the invention will appear from the description which follows hereinafter.

The synthesis of the isomers of bis(trichloroacetyl)-benzenes and their mixtures is carried out by the chlorination of diacetyl-benzene isomers or their mixtures by chlorine gas with the addition of small amounts of hexamethylenetetramine (about 0.5% of the starting diacetylbenzene weight). The reaction is carried out with the reagents in a molten state without any solvents. The product yields are 98–100% of theory.

The addition of small amounts of hexamethylenetetramine makes it possible to considerably reduce the duration of the chlorination process and prevent undesirable side-reactions (condensation, etc.).

Thus, chlorination of para-diacetylbenzene with the addition of 0.25–0.5% of hexamethylenetetramine lasts 5 hours: the chlorination of meta-diacetylbenzene with the addition of 0.25–0.5% of hexamethylenetetramine lasts 3–4 hours; the chlorination of the mixtures of diacetylbenzene isomers with the addition of hexamethylenetetramine lasts 3.5 to 4 hours.

The chlorination is carried out in a column-type reactor. Chlorine is delivered through a bubbler. The evolved exhaust gases are analyzed to determine chlorine and hydrogen chloride content. The chlorination is conducted at a temperature from 20 to 200° C. until hydrogen chloride stops to evolve, i.e., until the reaction of substitution of hydrogen for chlorine is over. The weight gain should correspond to the weight of the obtained bis (trichloroacetyl)-benzene.

Said chlorination process can be easily carried out in a continuous manner.

The obtained isomers of bis(trichloroacetyl)-benzene or their mixtures are hydrolysed with the formation of chloroform and phthalic acids. The yield of phthalic acids is 92–100% of theory; that of chloroform, 65–80%. $NaHCO_3$, $Na_2CO_3$, $Ca(OH)_2$, $K_2CO_3$ and others can be used as alkalifying agents.

In practical embodiment of the invention it is preferred that the process be carried out in a continuous manner. In this case the process is controlled by determining the specific gravity of the reaction products: while chlorine is substituting hydrogen, the specific gravities increase (specific gravity of diacetylbenzene is the lowest, and that of bis(trichloroacetyl)-benzene is the greatest).

Hydrolysis of bis(trichloroacetyl)-benzenes should be carried out in the solution of $Na_2CO_3$ gradually distilling obtained chloroform in the form of azeotropic mixture and returning the water to the reactor.

To make the invention more apparent to those skilled in the art the following examples are given by way of illustration.

Example 1

Through a mixture of 8.1 g. of meta-diacetylbenzene and 0.04 g. of hexamethylenetetramine, chlorine was passed at a rate of 10 g./hr. The reaction mixture was heated to 200° C. for two hours and the chlorination process was continued at this temperature for one hour more until hydrogen chloride stopped to evolve.

The weight gain of the reaction mixture was 10.3 g. The yield of meta-bis(trichloroacetyl)-benzene was 18.4 g. (99.75% of theory); boiling point 150° C. (2 mm. Hg), melting point 54.5–56° C.

Example 2

Through a mixture of 8.1 g. of meta-diacetylbenzene and 0.02 g. of hexamethylenetetramine chlorine was passed at a rate of 10 g./hr.

The reaction mixture was heated to 200° C. for two hours, and the chlorination process was continued at this temperature for another two hours until hydrogen chloride stopped to evolve.

The weight gain of the reaction mixture was 10.25 g. The yield of meta-bis(trichloroacetyl)-benzene was 18.35 g. (99.5% of theory). 36.9 g. of meta-bis(trichloroacetyl)-benzene were hydrolyzed while heating and stirring with a mixture of 250 ml. of water and 21.2 g. of soda. 12 ml. of chloroform were separated and distilled with water. The chloroform yield was 17.9 g. (74.85% of theory).

The reaction mixture was acidified by concentrated hydrochloric acid. The separated isophthalic acid was filtered off, washed with water and dried at 100° C.

The product yield was 15.98 g. (95.3% of theory).

Example 3

Through 16.2 g. of a technical mixture of diacetylbenzene (30% of para-isomer and 70% of meta-isomer) with 0.04 g. of hexamethylenetetramine chlorine was passed at a rate of 30 g./hr. The reaction mixture temperature was raised to 120° C. within 30 minutes and to 200° C. to the end of the second hour. The reaction mixture was chlorinated for another two hours at 200° C. until hydrogen chloride stopped to evolve.

The weight gain of the reaction mixture was 20.13 g. The yield of the mixture of bis(trichloroacetyl)-benzenes was 36.33 g. (98.4% of theory).

Example 4

16.2% g. of a technical mixture of diacetylbenzene and 0.08 g. of hexamethylenetetramine were treated in the same manner as shown in Example 3. The weight gain of the reaction mixture was 20.18 g.

The yield of a mixture of bis(trichloroacetyl)-benzenes was 36.38 g. (99.55% of theory). 31.6 g. of a mixture of bis(trichloroacetyl)-benzenes were hydrolyzed while heating and stirring with 250 ml. of water and 20 g. of soda. 10.8 ml. of chloroform were distilled with water.

The yield of chloroform was 16.1 g. (78.7% of theory).

The reaction mixture was acidified by hydrochloric acid. The separated mixture of acids was filtered off, washed with water and dried.

The yield of the acids was 13.9 g. (97.8% of theory).

Example 5

A mixture of 8.1 g. of para-diacetylbenzene and 0.02 g. of hexamethylenetetramine was heated to 60° C. and chlorine was passed therethrough at a rate of 10 g./hr. The reaction mixture was melted and the temperature was raised at a rate preventing crystallization of the chlorinated mixture. In 2.5 hours the temperature of the reaction mixture was raised to 200° C. and the chlorination process was continued for another 2.5 hours until hydrogen chloride stopped to evolve.

The weight gain of the reaction mixture was 10.14 g. The yield of para-bis(trichloroacetyl)-benzene was 18.24 g. (98.9% of theory).

Example 6

A mixture of 8.1 g. of para-diacetylbenzene and 0.04 g. of hexamethylenetetramine was chlorinated in the same manner as shown in Example 5 for five hours. The weight gain of the reaction mixture was 10.35 g. The yield of para-bis(trichloroacetyl)-benzene was 18.45 g. (100% of theory).

9 g. of para-bis(trichloroacetyl)-benzene were hydrolyzed while heating with 50 ml. of water and 2.5 g. of soda. 2.5 ml. of chloroform were distilled with water.

The chloroform yield was 3.73 g. (63.8% of theory). The terephthalic acid yield was 3.82 g. (94.3% of theory).

Example 7

A mixture of 8.1 g. of meta-diacetylbenzene and 0.04 g. of hexamethylenetetramine was charged into a reactor and chlorine was passed therethrough at a rate of 10 g./hr. Within the first hour the reaction mixture temperature was gradually raised to 136° C. and within the second hour to 200° C. The chlorination process lasted three hours more. During the fourth hour as little as 0.118 g. of hydrogen chloride was evolved. The total amount of HCl evolved was 11.008 g. (100.4% of theory).

The weight gain of the reaction mixture was 10.13 g. The yield of meta-bis(trichloroacetyl)-benzene was 18.23 g. (98.8% of theory).

Example 8

A mixture of 8.1 g. of para-diacetylbenzene and 0.04 g. of hexamethylenetetramine was charged into a reactor and chlorine was passed therethrough at a rate of 20 g./hr. The reaction mixture temperature was gradually raised to 200° C. and the reaction was over at the temperature of 200° C. The weight gain of the reaction mixture was 10.05 g.

The total amount of HCl evolved was 10.804 g. (98.9% of theory). The yield of para-bis(trichloroacetyl)-benzene was 18.15 g. (98.4% of theory).

Example 9

A mixture of 8.1 g. of para-diacetylbenzene and 0.04 g. of hexamethylenetetramine was charged into a reactor and chlorinated in the same manner as shown in Example 8 with the exception that the chlorine feed-rate was 15 g./hr.

The weight gain was 10.20 g.

The total amount of HCl evolved was 10.793 g. (98.5% of theory).

The yield of para-bis(trichloroacetyl)-benzene was 18.30 g. (99.3% of theory).

Para-bis(trichloroacetyl)-benzene was distilled in vacuum. $P=2.5$ mm. Hg, $T=180$–$181$° C., melting point 151–153° C.

The product was distilled with no gum formation, the product yield being high.

The present invention is particularly intended for the synthesis of phthalic acids, chloroform and esters of phthalic acids.

It should be noted that the present invention provides for manufacturing high purity products by a simple and fast process.

The proposed process has the following advantages:

(1) The addition of hexamethylenetetramine in an amount of approximately 0.5% allows to chlorinate not only meta-diacetylbenzene and its mixtures with para-isomer, but individual isomers too, particularly para-diacetylbenzene.

(2) The chlorination of diacetylbenzene isomers with a subsequent hydrolysis results in the formation of pure isomers of phthalic acids. The stage of separation of the acids or their dimethyl esters is eliminated which markedly reduces the amount of effluents and wastes.

(3) The quality of dimethyl ester of terephthalic acid obtained from para-bis(trichloroacetyl)-benzene meets the requirements of the synthetic fiber industry.

(4) During hydrolysis of bis(trichloroacetyl)-benzenes, chloroform of high purity is obtained which is proved by the results of spectrography and chromatography. Such chloroform can be successfully used in the production of fluoroplastics.

(5) The addition of hexamethylenetetramine also makes it possible to reduce the time required for the chlorination of meta-isomer and technical mixtures, whereby the coefficient of chlorine utilization considerably increases when the batch process is used. The continuous process can be employed as well.

(6) When used commercially, the proposed process will make it possible considerably to reduce the amount of reagents circulating in the system and to carry out the process in a concentrated phase, as a result of which the coefficients of utilization of the main reaction and auxiliary equipment can be markedly increased which permits to reduce the floor area and cut the consumption of power and auxiliary materials.

Though a specific embodiment of the invention has been disclosed in this description, it should be apparent to those skilled in the art that various changes and modifications can readily occur without departing from the spirit and scope of the invention and the appended claims.

What we claim is:

1. A process for manufacturing mixtures of isomers of bis-(trichloroacetyl)-benzenes consisting in the chlorination of a mixture of diacetylbenzene isomers in a molten state by chlorine gas in the presence of from 0.25 to 0.5% based on the starting diacetylbenzene weight of hexamethylenetetramine.

2. A process for the manufacturing of a mixture of isomers consisting of meta-bis(trichloroacetyl)-benzene and para-bis(trichloroacetyl)-benzene, wherein a molten mixture of meta and para-diacetylbenzenes is chlorinated with chlorine gas at a temperature of 20° to 200° C. in the presence of hexamethylenetetramine taken in an amount of from 0.25 to 0.50 percent by weight of the diacetylbenzene isomers used.

3. A process for the manufacture of meta-bis(trichloroacetyl)-benzene which comprises chlorinating meta-diacetylbenzene melt with chlorine gas at a temperature of 20° to 200° C. in the presence of hexamethylenetetramine taken in an amount from 0.25 to 0.50 percent by weight of the meta-diacetylbenzene used.

4. A process for the manufacture of para-bis(trichloroacetyl)-benzene which comprises chlorinating para-diacetylbenzene melt with chlorine gas at a temperature of 20° to 200° C. in the presence of hexamethylenetetramine taken in an amount of from 0.25 to 0.50 percent by weight of the para-diacetylbenzene used.

References Cited

FOREIGN PATENTS 138,613   6/1960   Russia _____ 260—592

DANIEL D. HORWITZ, *Primary Examiner.*